UNITED STATES PATENT OFFICE 2,130,137

PAPAIN PRODUCT AND METHOD OF PREPARING SAME

Alfred Klotz, Munich, Germany

No Drawing. Application September 15, 1936, Serial No. 100,872. In Germany April 16, 1936

9 Claims. (Cl. 195—63)

This invention relates to the manufacture of active dry preparations of papain and similar vegetable proteases.

The experiments relating to the activation of papain and similar vegetable proteases described in numerous scientific publications are dealing solely with the activity of the activators in aqueous solutions, but none of these publications discloses an active papain preparation in dry form.

Papain preparations activated with the usual activating agents cannot be dried without permanently losing their activity, because these activating agents, as for instance hydrocyanic acid and sulphur hydrogenated, volatilize upon drying of the aqueous solution, even if the drying is carried out in a vacuum at low temperatures.

The principal object of the present invention is to manufacture a dry preparation of papain which can be activated by moisture. In the process of the present invention, like in many of the known processes, hydrocyanic acid is used as activator. According to the present invention, however, the hydrocyanic acid is not applied in the usual manner by adding the acid or its salts to an aqueous solution of papain, but vegetable substances are used which give off hydrocyanic acid under the influence of an enzyme of vegetable origin called emulsin (amygdalase). The hydrocyanic acid generated in this manner enters into a biological combination with the papain or the analogous vegetable enzyme, respectively.

As a suitable vegetable substance for the purpose indicated, dry yeast may be used which contains the enzyme emulsin in ample quantity. There is no substantial difference between a dry yeast containing living cells, and a dry yeast which has been exposed for two hours to a temperature of 100° C. to destroy the living cells.

The dry yeast is mixed with dry papain in the ratio of 1:1, whereby a useful preparation is obtained, the activation of which is effected—as characteristic of the products of the invention—only at the moment when it is moistened with water or gastric juice. The moistening of the preparation has the effect that the emulsin of the yeast splits off the amygdaline contained in the yeast as well as that contained in the raw papain. Simultaneously, hydrocyanic acid is formed which is bound biologically to the papain.

A further increase of the activity of papain etc. may be obtained by additional use of a vegetable seed containing amygdaline. For this purpose the seed is unhusked, freed from oil, and pulverized and the powder obtained is used as an admixture to the preparation.

Examples of seeds containing amygdaline are the following: plum, apricot, peach, sweet and bitter almond, wild cherry, sweet cherry, apple, quince, red currant, poppy, lucerne, lentil, lupine, castor oil seed, cocoa bean, soy bean, olive, pumpkin, oat, barley, germinant corn, and many others.

If, besides amygdaline the enzyme emulsin is contained in the seed, which is usually the case, the seed alone may be able to activate the papain without aid of dry yeast. If, however, the seed, though containing amygdalin, does not contain any emulsin, the emulsin of the yeast may substitute the missing emulsin of the seed without substantial diminution of the effect.

The activation with which the mixture yeast + seed endows the papain etc., is a very considerable one, and exceeds, particularly regarding its action on peptone, the hydrocyanic acid activation as generally used in laboratories, although the quantities of hydrocyanic acid formed upon splitting off the amygdaline are infinitesimal in comparison with those employed in the known processes.

A marked advantage of the present invention is that the papain is retained inactive, i. e. insensitive to the oxygen of the air until it becomes moistened, and also the activators are not susceptible to any oxidation, because they become reducing agents only by enzymatic intermediate processes at the dissolution of the preparation in water, i. e. at the moment of use.

The following example illustrates an embodiment of the invention in which a dry papain preparation is manufactured with yeast and seed powder: About 50 parts of dried commercial papain in pulverized form are mixed with 30 parts of dry pulverized yeast (with living or dead cells). Furthermore about 20 parts of cocoabean seeds which have been previously unhusked, freed from oil and pulverized, are admixed to the preparation.

What I claim is:

1. The herein described method of manufacturing a dry preparation of papain capable of being activated by moisture, which method consists in adding to dry commercial papain a dry substance having a natural content of amygdalin and emulsin.

2. The herein described method of manufacturing a dry preparation of papain capable of being activated by moisture, which method consists in adding to dry commercial papain a mixture comprising dry yeast and a vegetable seed containing amygdalin.

3. A method, as claimed in claim 2, in which said vegetable seed consists of cocoa bean powder freed from oil.

4. A dry preparation of papain capable of being activated by moisture said preparation comprising dry papain and dry yeast.

5. A dry preparation of papain capable of being activated by moisture, said preparation comprising dry papain and a vegetable seed containing amygdalin and emulsin.

6. A dry preparation of papain capable of being activated by moisture, said preparation comprising dry papain and a mixture of dry yeast and a vegetable seed containing amygdalin.

7. A dry preparation of papain capable of being activated by moisture, said preparation containing dry papain and a mixture comprising dry yeast and cocoa bean powder freed from oil.

8. A method as claimed in claim 1, in which the dry substance to be added to the papain consists of yeast.

9. A method, as claimed in claim 1, in which the dry substance to be added to the papain consists of a vegetable seed containing amygdalin and emulsin.

ALFRED KLOTZ.